US009222617B1

(12) United States Patent
Kanuk

(10) Patent No.: US 9,222,617 B1
(45) Date of Patent: Dec. 29, 2015

(54) UNIVERSAL BIRD FEEDER HANGER SYSTEM

(71) Applicant: Daniel Kanuk, Chardon, OH (US)

(72) Inventor: Daniel Kanuk, Chardon, OH (US)

(*) Notice: Subject to any disclaimer, the term of this patent is extended or adjusted under 35 U.S.C. 154(b) by 89 days.

(21) Appl. No.: 14/195,616

(22) Filed: Mar. 3, 2014

Related U.S. Application Data

(60) Provisional application No. 61/814,429, filed on Apr. 22, 2013.

(51) Int. Cl.
*A01K 31/00* (2006.01)
*F16M 13/02* (2006.01)
*A01K 45/00* (2006.01)

(52) U.S. Cl.
CPC .............. *F16M 13/022* (2013.01); *A01K 45/00* (2013.01)

(58) Field of Classification Search
CPC ............................ A01K 45/00; F16M 13/022
USPC ........................................................ 119/52.2
See application file for complete search history.

(56) References Cited

U.S. PATENT DOCUMENTS

| 842,656 | A | * | 1/1907 | Hardsocg | 248/648 |
|---|---|---|---|---|---|
| 3,367,632 | A | | 2/1968 | Vail | |
| 4,057,211 | A | * | 11/1977 | Moore | 248/332 |
| 4,702,198 | A | * | 10/1987 | Holyoak | 119/432 |
| 5,067,621 | A | * | 11/1991 | Alexander | 211/117 |
| 5,503,108 | A | | 4/1996 | Shaw | |
| 5,860,248 | A | * | 1/1999 | Peters | A47G 7/047 47/66.6 |
| 7,185,606 | B1 | | 3/2007 | Racine | |
| 7,191,732 | B2 | | 3/2007 | Neal, Jr. | |
| 7,481,180 | B1 | * | 1/2009 | Snipes, Jr. | 119/51.5 |
| 8,245,441 | B1 | | 8/2012 | Domek | |
| 2003/0019436 | A1 | | 1/2003 | Nicholas | |

\* cited by examiner

*Primary Examiner* — Kristen C Hayes
*Assistant Examiner* — Ebony Evans
(74) *Attorney, Agent, or Firm* — RG Patent Consulting, LLC; Rachel Gilboy

(57) ABSTRACT

A universal bird feeder hanger system is a low cost cable and pulley apparatus that allows a user to easily raise and lower a birdfeeder for maintenance. A metal plastic coated cable has a loop at each end that is routed through a pulley. The proximate end attaches to a ground screw anchor via a first carabiner and the distal end attaches to a birdfeeder via a second carabiner hook. In between, the pulley is attached to a support structure such as a gutter. The birdfeeder is raised and lowered by disconnecting the proximate end from the ground screw anchor and moving toward or away from the birdfeeder.

20 Claims, 5 Drawing Sheets

UNIVERSAL BIRD FEEDER HANGER SYSTEM

CROSS-REFERENCE TO RELATED APPLICATION

The present application is related to and claims priority from prior provisional application Ser. No. 61/814,429, filed May 23, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of birdfeeders and more specifically relates to a universal birdfeeder hanger system.

2. Description of the Related Art

A popular pastime with many nature enthusiasts is bird watching. More serious enthusiasts travel to locations where certain species of birds can be photographed in the wild but many people neither have the time to travel nor can afford the expense very regularly. An alternative is bringing the bird species to the preferred location for easy and non-expensive viewing. To accomplish this, one of the best methods is to provide feed that attracts the desired species of bird. Homeowners often place birdfeeders in their yard for convenient viewing which allows the homeowner to go relatively unnoticed by the birds. An erroneous assumption is that the feeders need to be located away from the windows for the safety of the birds. However, the instructional website about.com, the National Bird Feeding Society, the Cornell Laboratory of Ornithology and the Audubon Society all recommend placing bird feeders within three feet of windows if possible. Studies show the birds will fly to the feeders and not past them. Home owners should have bird feeders located so that the birds can be viewed from just inside of the house by a window, or near a seating place on a porch. This greatly increases the enjoyment of feeding birds; seeing them gather seed up close.

Bird feeders are made in a variety of ways. Some feeders place the feed in the interior of an enclosure with an entrance hole sized to eliminate larger unwanted species, in addition to customizing the feed for the desired species. Bird feeders can be rigidly attached to a solid structure or suspended by a cord. Some suspension systems for hanging feeders can be either expensive, or expensive to construct. The general problem with suspended bird feeders is that they have to be located high enough to provide protection from ground predators. It follows then that the person refilling the bird seed has to employ a ladder to reach them. This can be very laborious and dangerous for elderly people. The seriousness of injuries from falls from ladders increase exponentially with age. A simple, less labor intensive and safer alternative is needed.

Various attempts have been made to solve the above-mentioned problems such as those found in U.S. Pub. No. 5,503,108 to Donald J. Shaw, U.S. Pat. No. 7,191,732 to Robert G. Neal, Jr., U.S. Pat. No. 7,185,606 to Paul P. Racine, U.S. Pub No. 2003/0019436 to Timothy Nicholas, U.S. Pat. No. 3,367,632 to Vail Arthur E, and U.S. Pat. No. 8,245,441 to Pamela J. Domek. This art is representative of adjustable height birdfeeder suspension systems. None of the above inventions and patents, taken either singly or in combination, is seen to describe the invention as claimed.

Ideally, a bird feeder suspension system should provide ease of use for reaching for maintenance and, yet would operate reliably and be manufactured at a modest expense. Thus, a need exists for a reliable universal bird feeder hanger system to avoid the above-mentioned problems, and provide the home owner with the enjoyment of viewing birds from inside their home, while birds are feeding outside, next to a window.

BRIEF SUMMARY OF THE INVENTION

In view of the foregoing disadvantages inherent in the known birdfeeder suspension art, the present invention provides a novel universal bird feeder hanger system. The general purpose of the present invention, which will be described subsequently in greater detail, is to provide a low cost, convenient, and safe birdfeeder suspension system for easy lowering and raising of the birdfeeder into desired position(s).

The present invention, universal bird feeder hanger system, as disclosed herein, preferably comprises: a birdfeeder hanger assembly having a hanger cable with a proximate end having a first loop and a first cable clamp, a distal end having a second loop with a second cable clamp, a first carabiner hook, a second carabiner hook, at least one pulley having an S-hook pulley hanger, a third cable clamp, and a ground screw anchor having a connection end and a ground anchor end.

The birdfeeder hanger assembly is useful for attaching to a support structure and to a birdfeeder to vertically adjust the elevation of the birdfeeder in relation to the ground surface at a user preferred height in front of a window. The proximate end of the hanger cable is doubled back and fastened to itself via the first cable clamp to comprise the first loop. The distal end of the hanger cable is also doubled back and fastened to itself via the second cable clamp to comprise the second loop. The first cable clamp and the second cable clamp preferably comprise U-bolts and backing plates that are attached to the U-bolts via fasteners.

The hanger cable may be plastic coated wire rope or cable, but could be cable or small diameter rope in some embodiments. The hanger cord is preferably about ⅛ inch diameter wire rope, minus the coating, such that the hanger cord is able to support the weight of a birdfeeder. The coating of the hanger cord may further be flexible and ultra violet light resistant to prevent oxidation of the hanger cord. The hanger cable is also able to be adjusted to a user preferred length via the first cable clamp and/or second cable clamp.

The first carabiner couples the first loop of the proximate end of the hanger cable to the connection end of the ground screw anchor once it has been anchored. The second carabiner couples the second loop of the distal end of the hanger cable to the top side of a birdfeeder. The first carabiner and the second carabiner are also known as snap hooks. The pulley with the S-hook pulley hanger rollably encloses about the hanger cable and couples to a support structure via the S-hook pulley hanger such that the hanger cable is able to move frictionless either direction through the pulley to raise or to lower the birdfeeder. The pulley comprises a single groove pulley wheel. The S-hook pulley hanger of the pulley preferably comprises an S-hook for connection to a support structure. A third cable clamp between the ground screw anchor and the pulley can be adjusted to stop the descent of the birdfeeder to suspend it above the ground.

The ground anchor end and the connection end of the ground screw anchor are at opposing ends from each other. The ground screw anchor preferably comprises an elongated spiral rod having a ground penetration point at the ground anchor end and a leveraged hand grip at the connection end. The connection end of the ground screw anchor is about 3 inches wide such that a user is able to easily grip and exert a leveraged twisting motion on the connection end while pushing down for inserting the ground anchor end into the ground surface. The connection end of the ground screw anchor comprising the grip is wider than the cross-sectional diameter of a shaft of the ground anchor end such that the user is easily able to exert a downward force, by hand, on the grip to cause the ground penetration point to penetrate a hard ground surface. The connection end of the ground screw anchor comprises a loop for attachment of the first loop of the proximate end of the hanger cord. The ground screw anchor is rotationally anchored into the ground surface having the connection end located above the ground surface.

The birdfeeder hanger assembly is suspended via at least one pulley and at least one S-hook pulley hanger that is attached to an elevated structure like a gutter. The horizontal distance that the ground screw anchor is rotationally anchored into the ground surface from the birdfeeder is able to determine the height above the ground surface that the birdfeeder is hung. The birdfeeder hanger assembly is useful for viewing a birdfeeder from a window inside a house at a user preferred height in relation to the ground surface and a support structure, and for maintaining the birdfeeder via lowering the feeder to the ground surface or to the third cable clamp, and then raising the birdfeeder to a user preferred height in front of a window upon completion of the maintenance.

A kit is embodied herein for the universal bird feeder hanger system preferably comprising: a birdfeeder hanger assembly having at least one hanger cable; at least one first cable clamp and one second cable clamp for constructing a first loop and a second loop of the hanger cord; at least one first carabiner for coupling to the ground screw anchor; at least one second carabiner for coupling to a birdfeeder; a third cable clamp to suspend the birdfeeder; at least one pulley having a S-hook pulley hanger for suspending the birdfeeder from an elevated structure; at least one ground screw anchor; and at least one set of user instructions.

In accordance with the embodiments of the present invention a preferred method of use is disclosed herein preferably comprising the steps of: routing the hanger cable of the birdfeeder hanger assembly through the pulley; coupling the S-hook pulley hanger of the pulley to an elevated structure; coupling the second carabiner to a birdfeeder; twist-inserting the ground screw anchor into a ground surface at a user preferred distance from the birdfeeder; attaching the first carabiner to the connection end of the ground screw anchor; and watching the birdfeeder.

The present invention holds significant improvements and serves as a universal bird feeder hanger system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, universal bird feeder hanger system, constructed and operative according to the teachings of the present invention.

The various embodiments of the present invention will hereinafter be described in conjunction with the appended drawings, wherein like designations denote like elements.

DETAILED DESCRIPTION

Figure 1:
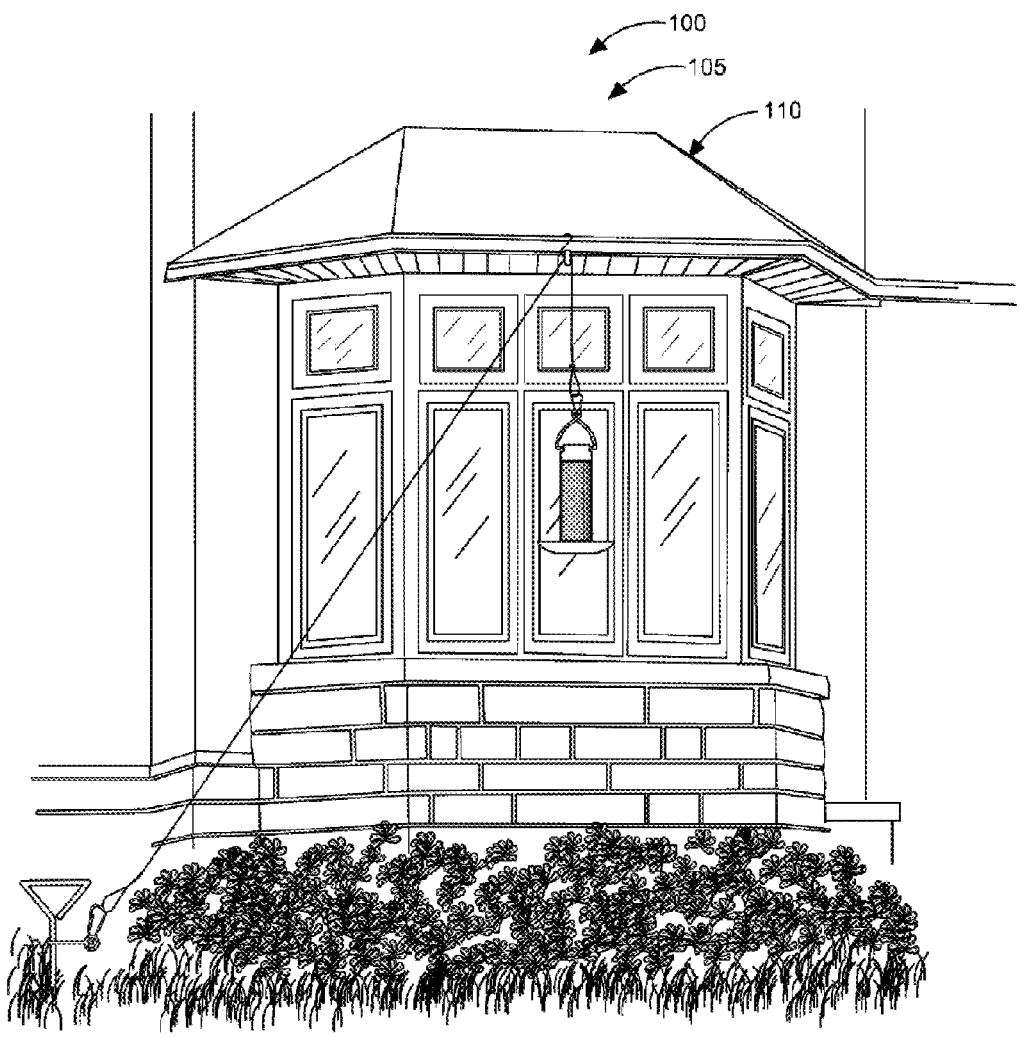
FIG. 1 shows a perspective view illustrating an in-use condition of a universal bird feeder hanger system according to an embodiment of the present invention.

As discussed above, embodiments of the present invention relate to a birdfeeder suspension system and more particularly to a universal bird feeder hanger system as used to improve convenience, lower the cost, and improve the safety of maintenance on elevated birdfeeders.

Generally speaking, a universal bird feeder hanger system is an apparatus that allows the user to easily raise and suspend a birdfeeder to a user preferred height, or to lower the birdfeeder to the ground for maintenance without necessitating the use of a ladder. Describing the invention in greater detail now, referring to the drawings by numerals of reference, there is shown in FIG. 1, a perspective view illustrating an in-use condition of universal bird feeder hanger system 100 according to an embodiment of the present invention.

Birdfeeder hanger assembly 105 is useful for attaching to support structure 110 and to birdfeeder 120 to vertically adjust the elevation of birdfeeder 120 in relation to the ground surface at a user preferred height. Birdfeeder hanger assembly 105 is suspended via at least one pulley 130 and at least one S-hook pulley hanger 140 that is attached to an elevated structure 112. The horizontal distance that ground screw anchor 170 is rotationally anchored into the ground surface from birdfeeder 120 is able to determine the height above the ground surface that birdfeeder 120 is hung. Birdfeeder hanger assembly 105 is useful for viewing birdfeeder 120 hung at a preferable height in relation to the ground surface and/or support structure 110, and for maintaining birdfeeder 120 or a feeder via lowering birdfeeder 120 to the ground surface or to a midway point such that third cable clamp 185 stops at the pulley thus suspending the birdfeeder at a distance above the ground, and then raising birdfeeder 120 to a user preferred height again upon refilling birdfeeder 120.

Figure 2:
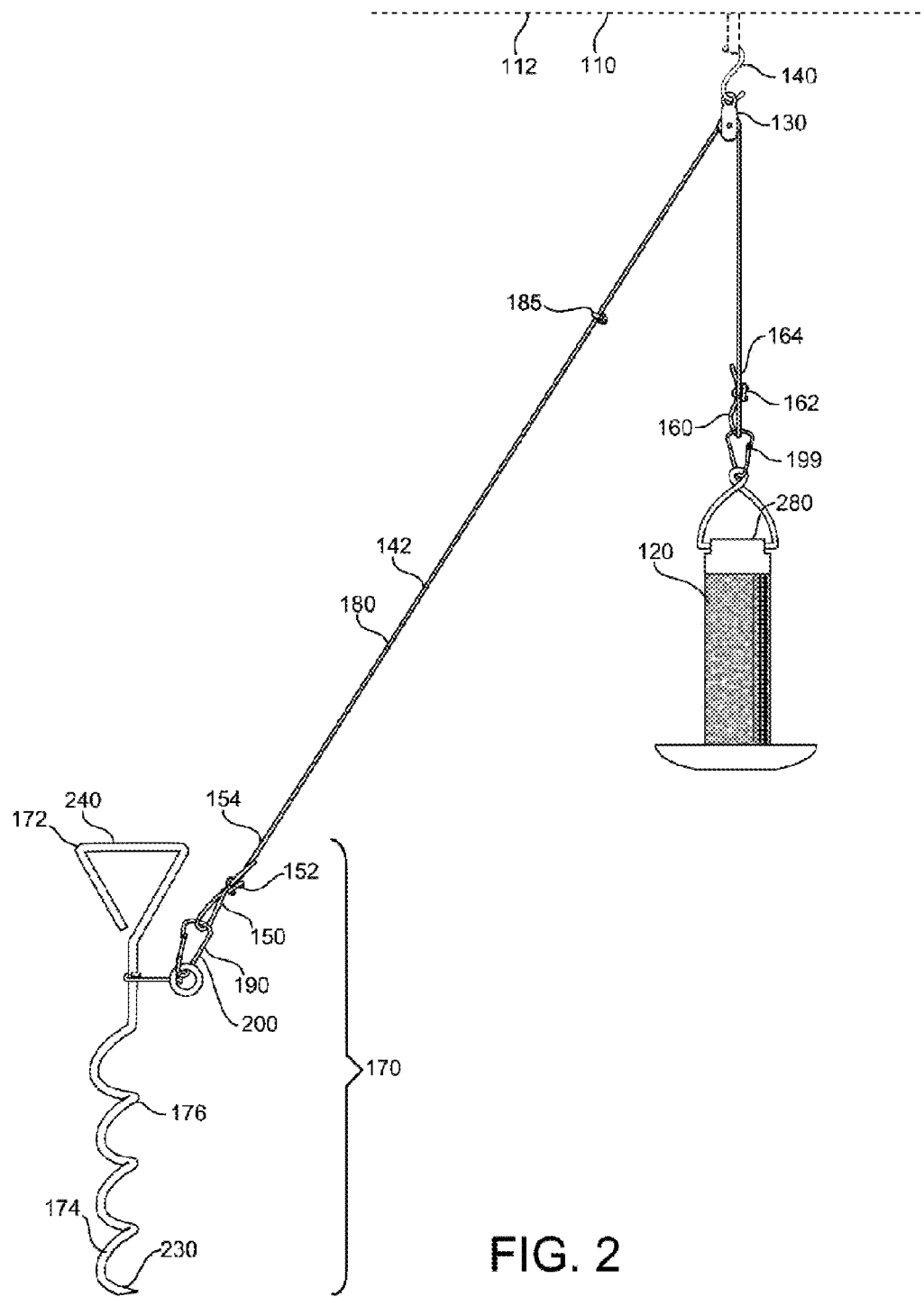
FIG. 2 is a perspective view illustrating the universal bird feeder hanger system according to an embodiment of the present invention of FIG. 1.

Referring now to FIG. 2, a perspective view illustrating universal bird feeder hanger system 100 according to an embodiment of the present invention of FIG. 1.

birdfeeder hanger assembly 105 comprises hanger cable 180 with proximate end 154 (having first loop 150 and first cable clamp 152), distal end 164 (having second loop 160 with second cable clamp 162), first carabiner 190, second carabiner 199, at least one pulley(s) 130 having S-hook pulley hanger 140, a third cable clamp to suspend the bird feeder above the ground; and ground screw anchor 170 (having connection end 172 and ground anchor end 174).

First carabiner 190 and second carabiner 199 may comprise snap-hooks 200. Pulley 130 with the S-hook pulley hanger 140 rollably encloses about hanger cable 180 and couples to support structure 110 via S-hook pulley hanger 140 such that hanger cable 180 is able to move frictionless either direction through pulley(s) 130 to raise or to lower birdfeeder 120. A plastic coated metal cable 142 has a loop at each end that is routed through pulley(s) 130. Proximate end 154 attaches to ground screw anchor 170 via first carabiner 190 and distal end 164 attaches to birdfeeder 120 via second carabiner 199. In between, pulley(s) 130 is attached to support structure 110. birdfeeder 120 is raised and lowered by disconnecting proximate end 154 from ground screw anchor 170 and moving toward or away from birdfeeder 120, and is suspended above the ground when the third cable clamp is stopped at the pulley.

Figure 3:
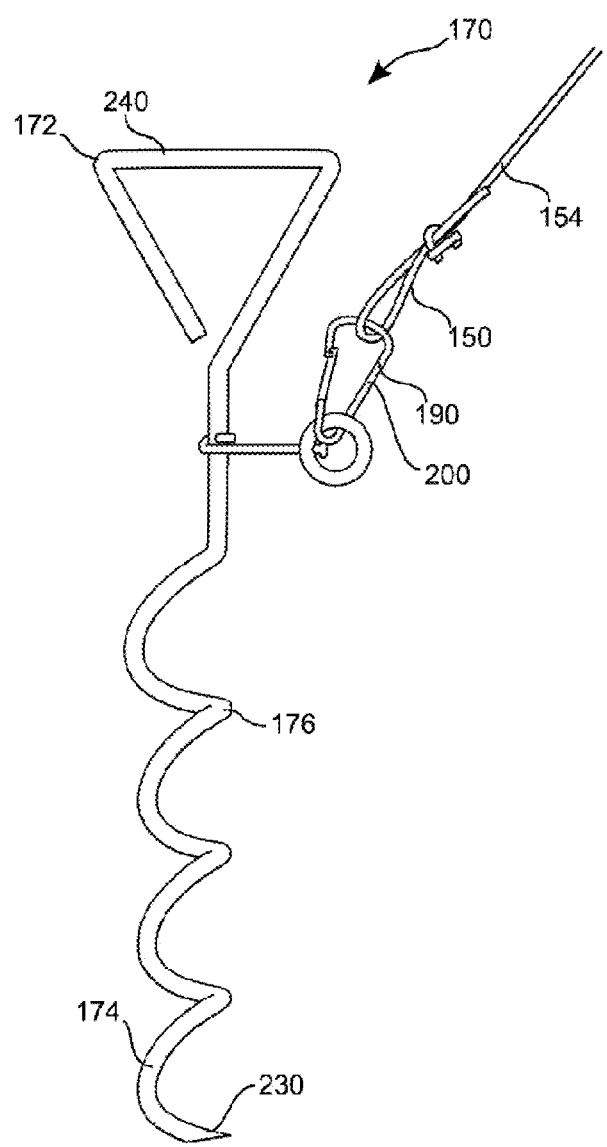
FIG. 3 is a perspective view illustrating a ground screw anchor of the universal bird feeder hanger system according to an embodiment of the present invention of FIG. 1.

Referring now to FIG. 3, a perspective view illustrating ground screw anchor 170 of universal bird feeder hanger system 100 according to an embodiment of the present invention of FIG. 1.

Ground screw anchor 170 is a device for rotationally inserting into the ground to create an anchor point for attaching distal end 164 of hanger cable 180 for suspending birdfeeder 120 at a preferred height. Ground screw anchor 170 has three defining portions, connection end 172, ground anchor end 174, and a screw shaped shaft 176. Ground anchor end 174 and connection end 172 of ground screw anchor 170 are at opposing ends from each other. Ground screw anchor 170 preferably comprises an elongated spiral rod having ground penetration point 230 at ground anchor end 174 and a leveraged hand grip 240 at connection end 172. Connection end 172 of ground screw anchor 170 is about 3 inches wide such that a user is able to easily grip and exert a leveraged twisting motion on connection end 172 while pushing down for inserting ground anchor end 174 into a ground surface. Connection end 172 of ground screw anchor 170 comprising hand grip 240 is wider than the cross-sectional diameter of shaft 176 of ground anchor end 174 such that a user is easily able to exert a downward force, by hand, on hand grip 240 to cause ground penetration point 230 to penetrate a hard ground surface. Connection end 172 of ground screw anchor 170 comprises a loop for attachment of first loop 150 of proximate end 154 of hanger cable 180. Ground screw anchor 170 is rotationally anchored into the ground surface having connection end 172 located above the ground surface in an in-use or ready-for-use condition.

Figure 4:
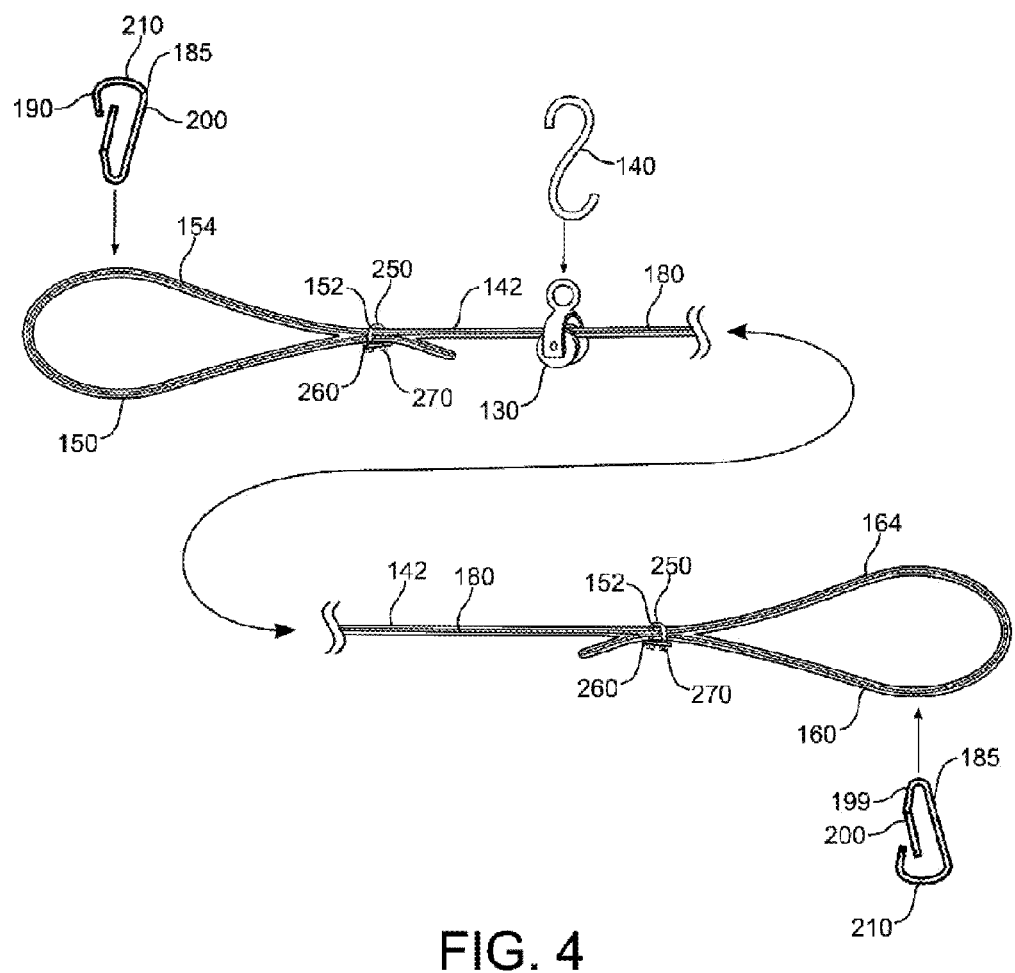
FIG. 4 is a perspective view illustrating a hanger cable and pulley of the universal bird feeder hanger system according to an embodiment of the present invention of FIG. 1.

Referring now to FIG. 4, showing a perspective view illustrating hanger cable 180 and pulley of universal bird feeder hanger system 100 according to an embodiment of the present invention of FIG. 1.

Proximate end 154 of hanger cable 180 is doubled back and fastened to itself via first cable clamp 152 to comprise first loop 150 and distal end 164 of hanger cable 180 is also doubled back and fastened to itself via second cable clamp 162 to comprise second loop 160. First loop 150 and second loop 160 are just large enough for attachment of first carabiner 190 and second carabiner 199 respectively. First cable clamp 152 and second cable clamp 162 preferably comprise U-bolts 250 and backing plates 260 that are attached to U-bolts 250 via fasteners 270 which lock the doubled back cable 142 to itself to create first 150 and second loop 160. Hanger cable 180 may be a plastic coated wire rope or cable 142. Hanger cable 180 is preferably about ⅛ inch diameter wire rope, minus coating, such that hanger cable 180 is able to support the weight of birdfeeder 120. A third cable clamp is used to stop the descent of the birdfeeder at a convenient level above the ground to allow for maintenance.

The coating of hanger cable 180 may further be flexible and ultra violet light resistant to prevent oxidation. Hanger cable 180 is also able to be adjusted to a user preferred length via first cable clamp 152 and/or second cable clamp 162. First carabiner 190 couples first loop 150 of proximate end 154 of hanger cable 180 to connection end 172 of a ground anchored ground screw anchor 170. Second carabiner 199 couples second loop 160 of distal end 164 of hanger cable 180 to top side 280 of a birdfeeder 120.

Universal bird feeder hanger system 100 may be sold as kit 450 comprising the following parts: at least one birdfeeder hanger assembly 105 having at least one hanger cable 180; at least one first cable clamp 152 and one second cable clamp 162 for constructing a first loop 150 and second loop 160 of hanger cable 180; at least one first carabiner 190 for coupling to ground screw anchor 170; at least one second carabiner 199 for coupling to birdfeeder 120; at least one pulley 130 having S-hook pulley hanger 140 for suspending birdfeeder 120 from elevated structure 112; at least one ground screw anchor 170; a third cable clamp to suspend the birdfeeder above the ground, and at least one set of user instructions. The kit has instructions such that functional relationships are detailed in relation to the structure of the invention (such that the invention can be used, maintained, or the like in a preferred manner). Universal bird feeder hanger system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different species-specific combinations, parts may be sold separately, etc., may be sufficient.

Figure 5:
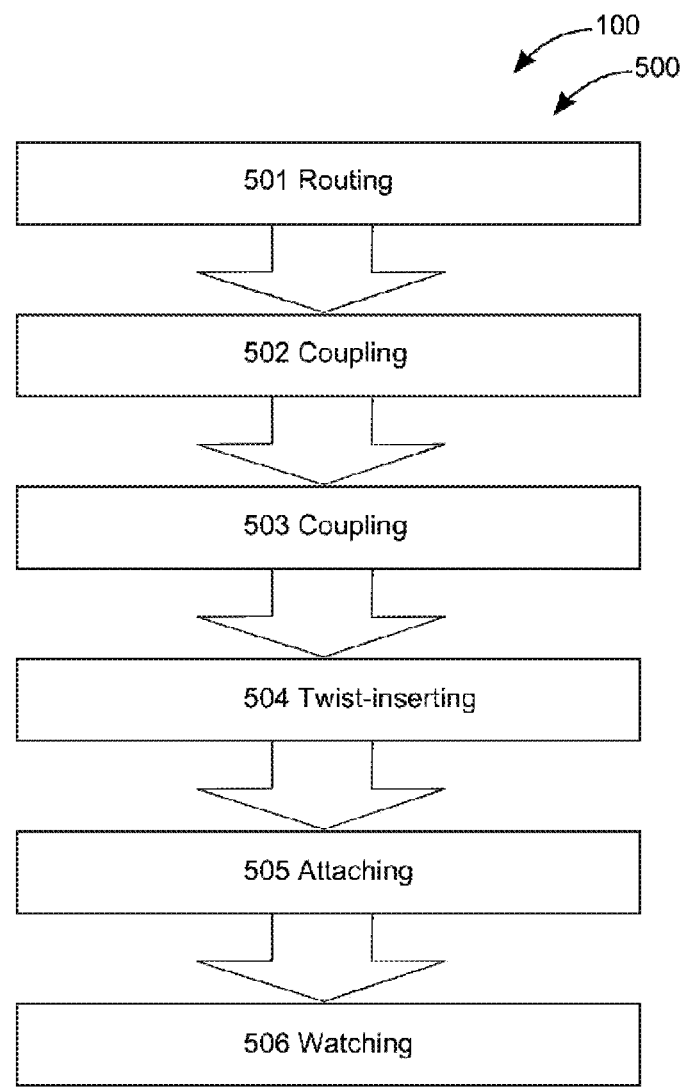
FIG. 5 is a flowchart illustrating a method of use for the universal bird feeder hanger system according to an embodiment of the present invention of FIGS. 1-4.

Referring now to FIG. 5, showing method of use 500 for universal bird feeder hanger system 100.

A method of using (method of use 500) universal bird feeder hanger system 100 may comprise the steps of: step one 501 routing hanger cable 180 of the birdfeeder hanger assembly 105 through pulley(s) 130; step two 502 coupling S-hook pulley hanger 140 of pulley(s) 130 to elevated structure 112; step three 503 coupling second carabiner 199 to birdfeeder 120; step four 504 twist-inserting ground screw anchor 170 into a ground surface at a user preferred distance from birdfeeder 120; step five 505 attaching first carabiner 190 to connection end 172 of ground screw anchor 170; and step six 506 watching birdfeeder 120.

It should be noted that steps 501-505 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A universal bird feeder hanger system comprising:
    a birdfeeder hanger assembly having;
        a hanger cable having;
            a proximate end having a first loop and first cable clamp;
            a distal end having a second loop and second cable clamp;
            a first carabiner hook;
            a second carabiner hook; and
            at least one pulley having an S-hook pulley hanger;
        a ground screw anchor having;
            a connection end; and
            a ground anchor end;
        wherein said birdfeeder hanger assembly is useful for attaching to a birdfeeder and vertically adjusting an elevation of said birdfeeder in relation to a ground surface at a user preferred height;
        wherein said proximate end of said hanger cable is doubled back and fastened to itself via said first cable clamp to comprise said first loop;
        wherein said distal end of said hanger cable is doubled back and fastened to itself via said second cable clamp to comprise said second loop;
        wherein said first carabiner couples said first loop of said proximate end of said hanger cable to said connection end of said ground screw anchor;
        wherein said second carabiner couples said second loop of said distal end of said hanger cable to a top side of said birdfeeder;
        wherein said at least one pulley having said S-hook pulley hanger rollably encloses about said hanger cable and couples to a support structure via said pulley hanger such that said hanger cable is able to move frictionless in either direction to raise and alternately to lower said birdfeeder;
        wherein said ground anchor end and said connection end of said ground screw anchor are at opposing ends from each other;
        wherein said ground screw anchor is rotationally anchored into a ground surface having said connection end located above said ground surface;
        wherein said birdfeeder hanger assembly is able to be height adjusted, via placement of said ground screw anchor in relation to said birdfeeder, said ground screw anchor located substantially beneath said ground surface; and
        wherein said birdfeeder hanger assembly is useful for viewing at a user preferred height in relation to said ground surface and said support structure and for maintaining said birdfeeder via lowering said birdfeeder to said ground surface and alternately raising said birdfeeder to said user preferred height upon completion of said maintenance.

2. The universal bird feeder hanger system of claim 1 wherein said hanger cable is plastic coated wire rope.

3. The universal bird feeder hanger system of claim 2 wherein said hanger cable is about ⅛ inch diameter wire rope such that said hanger cable is able to support a weight of said birdfeeder.

4. The universal bird feeder hanger system of claim 3 wherein said hanger cable further comprises a flexible ultra violet light resistant coating to prevent oxidation of said hanger cable.

5. The universal bird feeder hanger system of claim 1 wherein said pulley hanger of said pulley comprises an S-hook.

6. The universal bird feeder hanger system of claim 5 wherein said first carabineer and said second carabineer comprise biasing gate hooks.

7. The universal bird feeder hanger system of claim 6 wherein said first carabiner hook and said second carabiner comprises snap-hooks.

8. The universal bird feeder hanger system of claim 1 wherein a horizontal distance that said ground screw anchor is rotationally anchored into said ground surface is able to determine a height above said ground surface that said birdfeeder is hung.

9. The universal bird feeder hanger system of claim 1 wherein said ground screw anchor comprises an elongated spiral rod having a ground penetration point.

10. The universal bird feeder hanger system of claim 9 wherein said connection end of said ground screw anchor comprises a hand grip.

11. The universal bird feeder hanger system of claim 10 wherein said connection end of said ground screw anchor comprises a loop.

12. The universal bird feeder hanger system of claim 11 wherein said connection end of said ground screw anchor is about 3 inches wide such that a user is able to exert twist-leverage on said connection end for inserting said ground anchor end into said ground surface.

13. The universal bird feeder hanger system of claim 12 wherein said connection end of said ground screw anchor comprising said grip is wider than a cross-sectional diameter of a shaft of said ground anchor end such that a user is easily able to exert a downward force on said grip via a hand of said user to cause said ground penetration point to penetrate a hard said ground surface.

14. The universal bird feeder hanger system of claim 1 wherein said first cable clamp and said second cable clamp comprise U-bolts and backing plates attached via fasteners.

15. The universal bird feeder hanger system of claim 1 wherein said birdfeeder hanger assembly is suspended via at least one said pulley and at least one said S-hook pulley hanger, said S-hook pulley hanger attached to an elevated structure.

16. The universal bird feeder hanger system of claim 1 wherein said hanger cable is able to be adjusted to a user preferred length.

17. The universal bird feeder hanger system of claim 1 wherein said at least one pulley comprises a single groove pulley wheel.

18. A universal bird feeder hanger system comprising:
a birdfeeder hanger assembly having;
   a hanger cable having;
      a proximate end having a first loop and first cable clamp;
      a distal end having a second loop and second cable clamp;
   a first carabiner hook;
   a second carabiner hook;
   at least one pulley having an S-hook pulley hanger;
   a ground screw anchor having;
      a connection end; and
      a ground anchor end;
wherein said birdfeeder hanger assembly is useful for attaching to a birdfeeder and vertically adjusting an elevation of said birdfeeder in relation to a ground surface at a user preferred height;
wherein said proximate end of said hanger cable is doubled back and fastened to itself via said first cable clamp to comprise said first loop;
wherein said distal end of said hanger cable is doubled back and fastened to itself via said second cable clamp to comprise said second loop;
wherein said first cable clamp and said second cable clamp comprise U-bolts and backing plates attached via fasteners;
wherein said hanger cable is plastic coated wire rope;
wherein said hanger cable is about ⅛ inch diameter wire rope such that said hanger cable is able to support a weight of said birdfeeder;
wherein said hanger cable further comprises a flexible ultra violet light resistant coating to prevent oxidation of said hanger cable;
wherein said hanger cable is able to be adjusted to a user preferred length;
wherein said first carabiner couples said first loop of said proximate end of said hanger cable to said connection end of said ground screw anchor;
wherein said second carabiner couples said second loop of said distal end of said hanger cable to a top side of said birdfeeder;
wherein said first carabiner and said second carabiner comprises snap-hooks;
wherein said first carabineer and said second carabineer are biasing gate hooks;
wherein said at least one pulley having said S-hook pulley hanger rollably encloses about said hanger cable and couples to a support structure via said pulley hanger such that said hanger cable is able to move frictionless either direction to raise and alternately to lower said birdfeeder;
wherein said at least one pulley comprises a single groove pulley wheel;
wherein said ground anchor end and said connection end of said ground screw anchor are at opposing ends from each other;
wherein said ground screw anchor comprises an elongated spiral rod having a ground penetration point;
wherein said connection end of said ground screw anchor comprises a hand grip;
wherein said connection end of said ground screw anchor is about 6 inches wide such that a user is able to exert twist-leverage on said connection end for inserting said ground anchor end into said ground surface;
wherein said connection end of said ground screw anchor comprising said grip is wider than a cross-sectional diameter of a shaft of said ground anchor end such that a user is easily able to exert a downward force on said grip via a hand of said user to cause said ground penetration point to penetrate a hard said ground surface;
wherein said connection end of said ground screw anchor comprises a loop;
wherein said ground screw anchor is rotationally anchored into a ground surface having said connection end located above said ground surface;
wherein said birdfeeder hanger assembly is suspended via at least one said pulley and at least one said S-hook pulley hanger, said S-hook pulley hanger attached to an elevated structure;
wherein a horizontal distance that said ground screw anchor is rotationally anchored into said ground surface is able to determine a height above said ground surface that said birdfeeder is hung;
wherein said birdfeeder hanger assembly is able to be height adjusted, via placement of said ground screw anchor in relation to said birdfeeder, said ground screw anchor located substantially beneath said ground surface; and
wherein said birdfeeder hanger assembly is useful for viewing at a user preferred height in relation to said ground surface and said support structure and for maintaining said birdfeeder via lowering said birdfeeder to said ground surface and alternately raising said birdfeeder to said user preferred height upon completion of said maintenance.

19. The universal bird feeder hanger system of claim 18 further comprising a kit including:
said birdfeeder hanger assembly having at least one said hanger cable;
at least one said first cable clamp and one said second cable clamp for constructing said first loop and said second loop of said hanger cable;
at least one said first carabiner for coupling to said ground screw anchor;
at least one said second carabiner for coupling to said birdfeeder;
at least one said pulley having said S-hook pulley hanger for suspending said birdfeeder from said elevated structure;
at least one said ground screw anchor; and
at least one set of user instructions.

20. A method of using a universal bird feeder hanger system comprising the steps of:
routing a hanger cable of a birdfeeder hanger assembly through at least one pulley;
coupling an S-hook pulley hanger of said at least one pulley to an elevated structure;
coupling a carabiner to a birdfeeder;
twist-inserting a ground screw anchor into a ground surface at a user preferred distance from said birdfeeder, wherein said ground screw anchor is attached to said feeder via said hanger cable and is adapted to adjust a height of said birdfeeder;
attaching a carabiner to a connection end of said ground screw anchor; and
watching said birdfeeder from a homeowner's window.

* * * * *